US012416894B2

(12) United States Patent
Goto et al.

(10) Patent No.: US 12,416,894 B2
(45) Date of Patent: Sep. 16, 2025

(54) IMAGE FORMING APPARATUS

(71) Applicants: Yutaka Goto, Kanagawa (JP); Seiichi Kogure, Kanagawa (JP); Hiroshi Kikuchi, Kanagawa (JP); Hirotaka Hatta, Kanagawa (JP); Hideki Kimura, Kanagawa (JP); Yusuke Ishizuka, Kanagawa (JP); Takuya Akiyama, Kanagawa (JP); Yuuki Aoki, Tokyo (JP)

(72) Inventors: Yutaka Goto, Kanagawa (JP); Seiichi Kogure, Kanagawa (JP); Hiroshi Kikuchi, Kanagawa (JP); Hirotaka Hatta, Kanagawa (JP); Hideki Kimura, Kanagawa (JP); Yusuke Ishizuka, Kanagawa (JP); Takuya Akiyama, Kanagawa (JP); Yuuki Aoki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/400,097

(22) Filed: Dec. 29, 2023

(65) Prior Publication Data

US 2024/0255890 A1 Aug. 1, 2024

(30) Foreign Application Priority Data

Jan. 30, 2023 (JP) ................................ 2023-011838

(51) Int. Cl.
*G03G 21/00* (2006.01)
*G03G 15/16* (2006.01)

(52) U.S. Cl.
CPC ....... *G03G 21/0047* (2013.01); *G03G 15/161* (2013.01); *G03G 21/0076* (2013.01);
(Continued)

(58) Field of Classification Search
CPC ........... G03G 21/0047; G03G 21/0076; G03G 15/161; G03G 2221/001; G03G 2221/1627
See application file for complete search history.

(56) References Cited

U.S. PATENT DOCUMENTS

| | | | |
|---|---|---|---|
| 5,555,081 | A | 9/1996 | Hatta et al. |
| 5,697,038 | A | 12/1997 | Hatta et al. |

(Continued)

FOREIGN PATENT DOCUMENTS

| | | | |
|---|---|---|---|
| JP | 2000-131957 | A | 5/2000 |
| JP | 2005-004079 | A | 1/2005 |

(Continued)

*Primary Examiner* — Stephanie E Bloss
*Assistant Examiner* — Michael A Harrison
(74) *Attorney, Agent, or Firm* — Harness, Dickey & Pierce, P.L.C.

(57) ABSTRACT

An image forming apparatus includes a toner image bearer, a transfer device, a cleaner, a bias power source, and circuitry. The toner image bearer bears a toner image. The transfer device performs a transfer process. The cleaner contacts the toner image bearer to remove transfer residual toner that is subject to the transfer process and remove untransferred toner that is not subject to the transfer process. The bias power source applies one of a first bias and a second bias different from the first bias to the cleaner. The circuitry controls the bias power source to output the first bias to the cleaner in response to a start of an image forming operation to remove the untransferred toner from the toner image bearer and control the bias power source to switch an output from the first bias to the second bias.

13 Claims, 5 Drawing Sheets

(52) U.S. Cl.
CPC ................. *G03G 2221/001* (2013.01); *G03G 2221/1627* (2013.01)

(56) References Cited

U.S. PATENT DOCUMENTS

| | | | | |
|---|---|---|---|---|
| 5,852,762 | A | 12/1998 | Hatta et al. | |
| 5,873,021 | A | 2/1999 | Hatta et al. | |
| 6,148,171 | A | 11/2000 | Kamijo | |
| 12,153,372 | B2 | 11/2024 | Ohmori et al. | |
| 2008/0008483 | A1* | 1/2008 | Hamaya | G03G 15/166 399/71 |
| 2012/0008973 | A1* | 1/2012 | Sakakibara | G03G 15/161 399/101 |
| 2014/0093295 | A1 | 4/2014 | Kojima et al. | |
| 2014/0233997 | A1 | 8/2014 | Asaoka et al. | |
| 2014/0321874 | A1 | 10/2014 | Sugiura et al. | |
| 2015/0147074 | A1* | 5/2015 | Wada | G03G 21/0047 399/21 |
| 2015/0205248 | A1 | 7/2015 | Yogosawa et al. | |
| 2015/0261137 | A1 | 9/2015 | Mitani et al. | |
| 2016/0124374 | A1 | 5/2016 | Yogosawa et al. | |
| 2016/0139555 | A1 | 5/2016 | Honjoh et al. | |
| 2016/0161887 | A1 | 6/2016 | Sugiura et al. | |
| 2016/0170365 | A1 | 6/2016 | Mitani et al. | |
| 2016/0216647 | A1 | 7/2016 | Yogosawa et al. | |
| 2016/0216682 | A1 | 7/2016 | Sengoku et al. | |
| 2017/0097589 | A1 | 4/2017 | Seki et al. | |
| 2018/0046115 | A1 | 2/2018 | Fujita et al. | |
| 2018/0059583 | A1 | 3/2018 | Kumagai et al. | |
| 2018/0059595 | A1 | 3/2018 | Akiyama et al. | |
| 2018/0157196 | A1 | 6/2018 | Kogure et al. | |
| 2018/0341201 | A1 | 11/2018 | Kogure et al. | |
| 2020/0233365 | A1 | 7/2020 | Kimura et al. | |
| 2021/0063919 | A1 | 3/2021 | Nakamoto et al. | |
| 2021/0223721 | A1 | 7/2021 | Goto et al. | |
| 2021/0333725 | A1 | 10/2021 | Nakamoto et al. | |
| 2022/0317601 | A1 | 10/2022 | Aoki et al. | |
| 2023/0061068 | A1 | 3/2023 | Goto et al. | |
| 2023/0103454 | A1 | 4/2023 | Kikuchi et al. | |
| 2023/0236536 | A1 | 7/2023 | Ohmori et al. | |
| 2023/0384730 | A1 | 11/2023 | Shimada et al. | |

FOREIGN PATENT DOCUMENTS

| | | | |
|---|---|---|---|
| JP | 2016-075949 | A | 5/2016 |
| JP | 2016-142879 | A | 8/2016 |

* cited by examiner

IMAGE FORMING APPARATUS

CROSS-REFERENCE TO RELATED APPLICATION

This patent application is based on and claims priority pursuant to 35 U.S.C. § 119(a) to Japanese Patent Application No. 2023-011838, filed on Jan. 30, 2023, in the Japan Patent Office, the entire disclosure of which is hereby incorporated by reference herein.

BACKGROUND

Technical Field

Embodiments of the present disclosure generally relate to an image forming apparatus.

Related Art

An electrophotographic image forming apparatus includes a cleaning device. One type of cleaning device includes a cleaner to which a bias is applied. The cleaner is in contact with the face of an intermediate transfer belt or a photoconductor serving as a toner image bearer. An electrostatic force generated by the cleaner removes transfer residual toner on the intermediate transfer belt or the photoconductor.

SUMMARY

This specification describes an improved image forming apparatus that includes a toner image bearer, a transfer device, a cleaner, a bias power source, and circuitry. The toner image bearer bears a toner image formed by image forming operation. The transfer device performs a transfer process to transfer the toner image from the toner image bearer to a sheet. The cleaner contacts the toner image bearer to remove transfer residual toner on the toner image bearer that is subject to the transfer process and remove untransferred toner on the toner image bearer that is not subject to the transfer process. The bias power source applies one of a first bias and a second bias different from the first bias to the cleaner. The circuitry controls the bias power source to output the first bias to the cleaner in response to a start of the image forming operation to remove the untransferred toner from the toner image bearer and control the bias power source to switch an output from the first bias to the second bias to remove the transfer residual toner from the toner image bearer.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
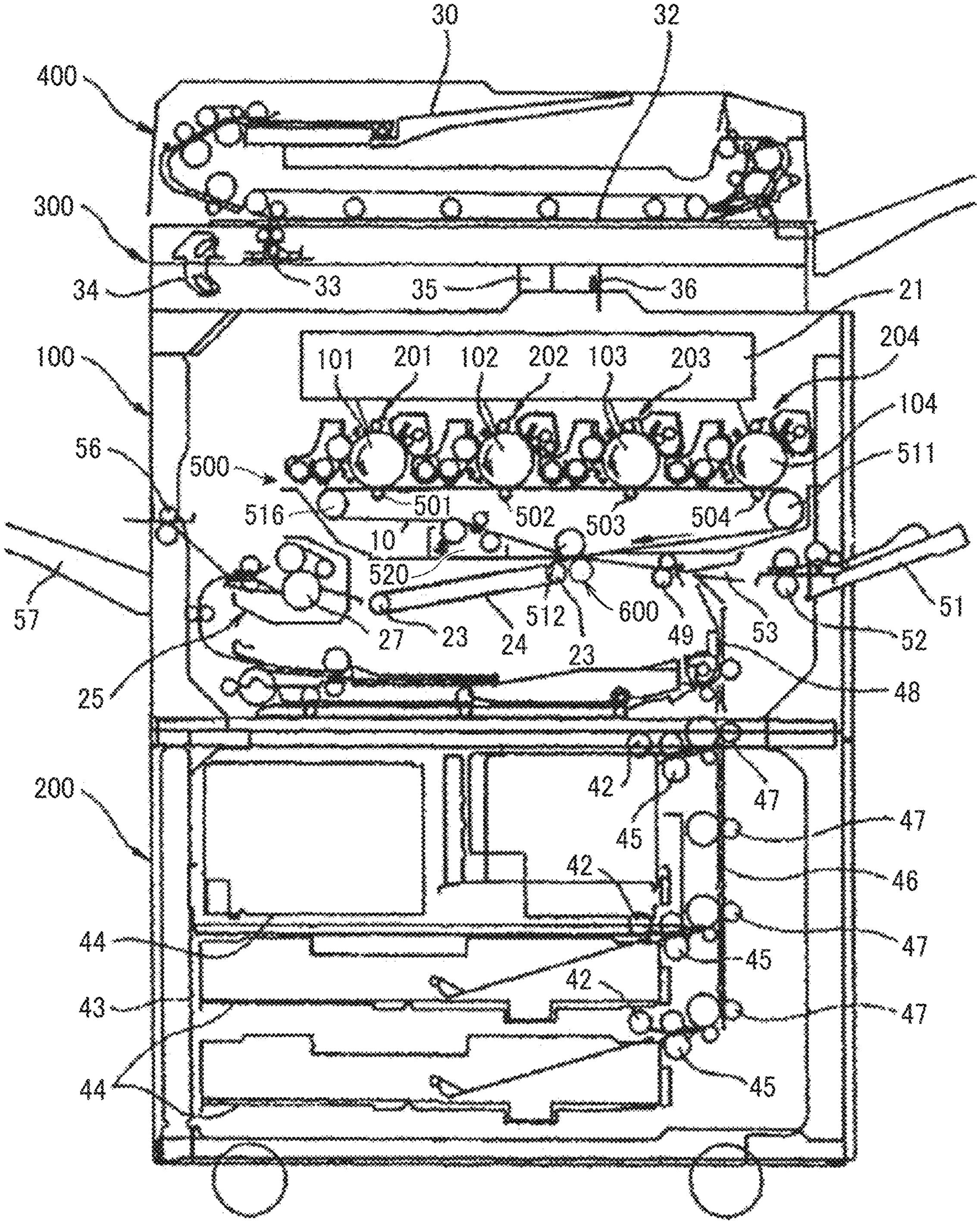
FIG. 1 is a schematic diagram illustrating a configuration of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a," "an," and "the" are intended to include the plural forms as well, unless the context clearly indicates otherwise.

Referring now to the drawings, embodiments of the present disclosure are described below. Identical reference numerals are assigned to identical components or equivalents and a description of those components is simplified or omitted.

Figure 2:
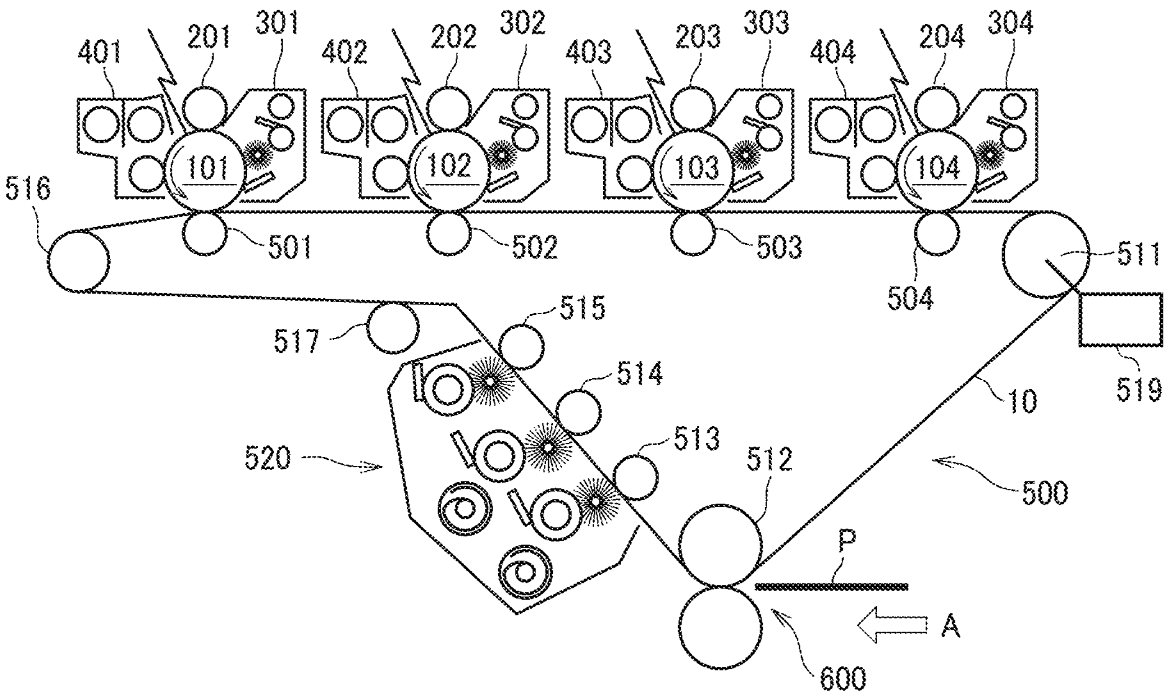
FIG. 2 is a schematic diagram illustrating a configuration around an intermediate transfer unit.

FIG. 1 is a schematic diagram illustrating a configuration of a tandem type image forming apparatus employing an intermediate transfer method. FIG. 2 is a schematic diagram of a part of the image forming apparatus including an intermediate transfer unit. A sheet is conveyed in a direction indicated by an arrow A in FIG. 2.

The image forming apparatus in FIG. 1 includes a printer section 100, a sheet feeder 200, a scanner 300, and a document feeder 400. The scanner 300 is disposed on the printer section 100. The document feeder 400 is disposed on the scanner 300. In the present embodiment, the document feeder 400 is an automatic document feeder (ADF).

The scanner 300 includes an exposure glass 32, first and second carriers 33 and 34, an image forming lens 35, and a reading sensor 36. The scanner 300 reads image data of a document placed on the exposure glass 32 with the reading sensor 36, and sends the image data thus read to a controller 540 that is circuitry. According to the image data received from the scanner 300, the controller 540 controls, e.g., a laser or a light-emitting diode (LED) array disposed inside an exposure device 21 to irradiate surfaces of four drum-shaped photoconductors 101, 102, 103, and 104 with laser beams L. The exposure device 21 and the photoconductors 101, 102, 103, and 104 are included in the printer section 100. By emitting the laser light L, electrostatic latent images are formed on the surfaces of the photoconductors 101, 102, 103, and 104 and developed into toner images through a predetermined developing process.

In addition to the exposure device 21 and the photoconductors 101, 102, 103, and 104, the printer section 100 includes primary transfer rollers 501, 502, 503, and 504, a secondary transfer device 600, a fixing device 25, a paper ejection device such as a pair of paper ejection rollers 56, and a toner supplier.

Four drum-shaped photoconductors 101, 102, 103, and 104 as image bearers arranged in parallel are configured to be rotatable counterclockwise in FIG. 1. Toner image forming devices are disposed around each of the photoconductors 101, 102, 103, and 104 to form a color toner image on the each of the photoconductors 101, 102, 103, and 104. The toner image forming devices have the same configuration except that the colors of toners (color materials: for example, yellow, magenta, cyan, and black) are different.

Around the photoconductors 101, 102, 103, and 104, dischargers to remove charges on the surfaces of the photoconductors 101, 102, 103, and 104, chargers 201, 202, 203, and 204 to uniformly charge the surfaces of the photoconductors 101, 102, 103, and 104, and developing devices 401, 402, 403, and 404 to develop formed electrostatic latent images are arranged in this order, respectively. In addition, photoconductor cleaners 301, 302, 303, and 304 are disposed around the photoconductors 101, 102, 103, and 104 to clean the surfaces of the photoconductors 101, 102, 103, and 104 after the toner images are transferred to an intermediate transferor, respectively.

An intermediate transfer unit 500 is disposed below the photoconductors 101, 102, 103, and 104. As illustrated in FIG. 2, the intermediate transfer unit 500 includes a driving roller 511, multiple support rollers 512, 513, 514, 515, 516, and 517, and a belt-shaped intermediate transferor 10 as a toner image bearer stretched around the driving roller 511 and the multiple support rollers 512, 513, 514, 515, 516, and 517. The image forming apparatus includes a motor 519 to drive and rotate the driving roller 511 clockwise in FIG. 2 and rotate the intermediate transferor 10 clockwise in FIG. 2.

As illustrated in FIG. 1, the image forming apparatus includes the primary transfer rollers 501, 502, 503, and 504 facing the photoconductors 101, 102, 103, and 104, respectively. The intermediate transferor 10 is interposed between the photoconductors 101, 102, 103, and 104 and the primary transfer rollers 501, 502, 503, and 504. The primary transfer rollers 501, 502, 503, and 504 transfer toner images formed on the photoconductors 101, 102, 103, and 104 to the intermediate transferor 10, respectively. The image forming apparatus includes a cleaning device 520 according to the present embodiment to remove residual toner remaining on the intermediate transferor 10, which is described below.

The secondary transfer device 600 is disposed at a position downstream from the primary transfer rollers 501, 502, 503, and 504 and facing the secondary transfer opposed roller 512 via the intermediate transferor 10. The secondary transfer device 600 is made of a secondary transfer roller as illustrated in FIG. 2 but may be made of a secondary transfer belt stretched by several support rollers and a driving roller.

The sheet feeder 200 includes an automatic feeding section provided below the printer section 100 and a manual bypass section provided on a side of the printer section 100. The automatic feeding section includes a paper bank 43, multiple trays 44 disposed one above the other in the paper bank 43, feed rollers 42 each of which picks up the sheet as a recording medium from the corresponding tray 44, separation rollers 45 each of which separates the uppermost sheet from the sheets in the corresponding tray 44 and sends the sheet to a first conveyance passage 46, and conveyance rollers 47 each of which conveys the sheet toward a second conveyance passage 48 in the printer section 100.

The bypass section includes a manual sheet feeding tray 51 and a second separation roller 52 that separates the uppermost sheet from the sheets placed on the manual sheet feeding tray 51 to send the separated sheet toward a bypass conveyance passage 53. A pair of registration rollers 49 is disposed around an end of the second conveyance passage 48 in the printer section 100. The pair of registration rollers 49 receives the sheet sent from one of the trays 44 or from the manual sheet feeding tray 51 and then sends the sheet at a predetermined time to a secondary transfer nip formed between the secondary transfer device 600 and the intermediate transferor 10.

A document is placed on a document table 30 of the document feeder 400 to copy a color image, or the document feeder 400 is opened and the document is placed on the exposure glass 32 of the scanner 300, and then closes the document feeder 400 to press the document against the exposure glass 32. Subsequently, the operator presses a start key. The scanner 300 is activated after the document is conveyed onto the exposure glass 32 if the document is placed on the document feeder 400. Alternatively, the scanner 300 is activated immediately if the document is placed on the exposure glass 32. Specifically, the first and second carriers 33 and 34 move, and light emitted from a light source of the first carrier 33 is reflected from a surface of the document toward the second carrier 34. The light is then reflected from a mirror of the second carrier 34 and reaches the reading sensor 36 via the image forming lens 35. The reading sensor 36 reads the light as image data.

When the image data is read as described above, the motor 519 drives and rotates the driving roller 511 to rotate the intermediate transferor 10. Support rollers 512, 513, 514, 515, 516, and 517 are driven and rotated by the intermediate transferor 10. In addition, as described above, the exposure device 21 irradiates the surfaces of the photoconductors with the laser beams L to form latent images thereon. The developing devices perform developing processes to form the toner images. Then, the toner image is formed while the photoconductor rotates. Sequentially, the toner images are electrostatically transferred onto the intermediate transferor 10 at respective primary transfer nips where the intermediate transferor contacts the photoconductors 101, 102, 103, and 104, so that the toner images are superimposed one atop another on the intermediate transferor 10 to form a four-color toner image thereon.

In the meantime, the sheet feeder 200 rotates one of the three feed rollers 42 to direct the sheet having an appropriate size for the image data toward the second conveyance passage 48 of the printer section 100. The sheet enters the second conveyance passage 48 and is sandwiched by the pair of registration rollers 49, and the pair of registration rollers 49 temporarily stops conveying the sheet. At a predetermined time, the pair of registration rollers 49 sends the sheet toward the secondary transfer nip where the intermediate transferor 10 contacts the secondary transfer device 600. At the secondary transfer nip, the sheet coincides with and closely contacts the toner image on the intermediate transferor 10. A transfer electric field and a nip pressure in the secondary transfer nip secondarily transfer the toner image onto the sheet P, which is referred to as a transfer process in this specification.

After the sheet passes through the secondary transfer nip, a conveyance belt 24 rotated and supported by rollers 23 sends the sheet to the fixing device 25. In the fixing device 25, the toner image is fixed onto the sheet under heat applied by a heating belt and pressure applied by a pressure roller 27. Subsequently, a pair of paper ejection rollers 56 ejects the sheet onto an output tray 57 provided on a side of the printer section 100. The image forming apparatus may include a sheet reversing device below the secondary transfer device and the fixing device 25 to reverse and convey the sheet P and print another toner image on the back side of the sheet P.

The intermediate transferor 10 may be a single-layer or multi-layer belt formed with a material such as polyvinylidene fluoride (PVDF), ethylene-tetrafluoroethylene copolymer (ETFE), polyimide (PI), and polycarbonate (PC), and a conductive material such as carbon black is dispersed therein. The intermediate transferor 10 is manufactured through a casting process, or a centrifugal molding process. The surface of the intermediate transfer belt 8 may be polished as necessary. The intermediate transferor 10 may include a release layer coated on the surface of the intermediate transferor 10 as needed. Examples of a material usable for the release layer (coating) include, but are not limited to, fluoroplastic such as ETFE, polytetrafluoroethylene (PTFE), PVDF, perfluoroalkoxy polymer resin (PFA), tetrafluoroethylene-hexafluoropropylene copolymer (FEP), and polyvinyl fluoride (PVF).

Preferably, the volume resistivity of the intermediate transferor 10 is adjusted within a range of from $10^8$ to $10^{12}$ Ω·cm, and the surface resistivity of the intermediate transferor 10 is adjusted within a range of from $10^9$ to $10^{13}$ Ω/sq. When the volume resistivity of the intermediate transferor 10 exceeds the above-mentioned range, a transfer bias used for transfer becomes too high, which leads to an unfavorable increase in electric power cost. In this case, the intermediate transferor 10 has a high charge potential in the secondary transfer process and the sheet separation process, and self-discharge of the intermediate transferor 10 becomes difficult. Accordingly, the intermediate transferor 10 would require a discharger.

When the volume resistivity and the surface resistivity fall below the above-mentioned ranges, the charge potential of the intermediate transferor 10 is more quickly attenuated, which is advantageous for self-discharge. However, the electric current flows in a planar direction at the time of transfer and undesirably promotes the scattering of toner. To measure the volume resistivity and the surface resistivity described above, a high resistance resistivity meter (Hiresta produced by Mitsubishi Kasei Corporation) is coupled to an HRS probe (an inside electrode has a diameter of 5.9 mm, and a ring electrode has an inner diameter of 11 mm), and a voltage of 100V (500V for measurement of the surface resistivity) to the front and back sides of the intermediate transferor 10. The measurement value after 10 seconds from application of the voltage is used.

The primary transfer rollers 501, 502, 503, and 504 are, for example, obtained by applying a foamed resin material to a core made of metal such as iron, steel use stainless (SUS), or aluminum. The thickness of the foam material may be 2 mm to 10 mm but is not limited to this.

The following describes the toners used in the image forming apparatus according to the present embodiment.

The volume average particle diameter of the toner is preferably 4 to 10 μm. The toner having the volume average particle diameter smaller than 4 μm causes background stains in a developing process and has a low fluidity that is liable to cause aggregation, and the aggregation may cause voids in the toner image. In contrast, the toner having the volume average particle diameter larger than 10 μm is likely to cause toner scattering and deterioration of resolution. A high-definition image cannot be obtained.

Preferably, the toner has a shape factor SF-1 of from 100 to 180 and a shape factor SF-2 of from 100 to 180.

Figures 3A, 3B:
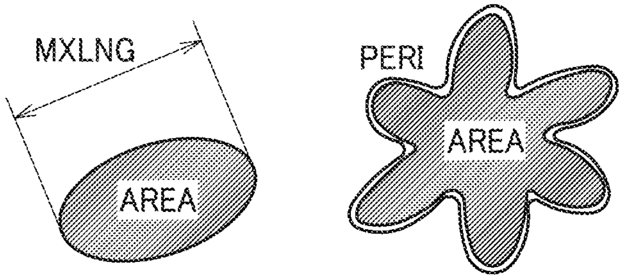
FIGS. 3A and 3B are schematic diagrams to illustrate shape factors of toner.

FIG. 3A is a schematic diagram illustrating the shape of a toner particle for understanding the shape factor SF-1. The first shape factor SF-1 shows a degree of roundness and is expressed by formula 1;

$$SF-1=\{(MXLNG)^2/\text{AREA}\}\times(100\pi/4), \quad \text{Formula 1}$$

wherein MXLGN is the maximum length of toner particle projected on a two-dimensional surface and AREA is an area of toner particle.

The toner particle is a sphere when the first shape factor SF-1 is 100. As the SF-1 increases, the toner particle becomes more amorphous.

FIG. 3B is a schematic diagram illustrating a shape of a toner particle for understanding of the shape factor SF-2.

The second shape factor SF-2 shows a degree of irregularity and is expressed by formula 2;

$$SF-2=\{(PERI)^2/\text{AREA}\}\times(100\pi/4), \quad \text{Formula 2}$$

wherein PERI is a peripheral length of toner particle projected on a two-dimensional surface and AREA is the area of the toner particle.

When the second shape factor SF-2 is 100, the toner surface has small asperities, and as the value of SF-2 increases, the asperities on the toner surface become larger.

The shape factors can be measured by taking a picture of the toner particles with a scanning electron microscope S-800 from Hitachi, Ltd., and analyzing particles with an image analyzer LUSEX 3 from Nireco Corporation to calculate the shape factors. The contact areas among toner particles are small when toner particles are substantially spherical in shape. Adsorption power among toner particles is weak and flowability is high. Further, the adsorption power of the toner particles to the photoconductor is weak as well, and transfer efficiency can be enhanced. When either the shape factor SF-1 or SF-2 exceeds 180, the transfer rate deteriorates.

The cleaning device 520 is described below.

While the image forming apparatus of the present embodiment forms the toner image, transfer residual toner that has not been transferred from the intermediate transferor 10 to the sheet adheres to the intermediate transferor 10 downstream from the secondary transfer device 600. Immediately after the occurrence of the jam, toner that is transferred from the photoconductor to the intermediate transferor 10 and is not transferred to the sheet adheres to the intermediate transferor 10. Such toner is referred to as untransferred toner below. The transferred toner is subject to the transfer process, but the untransferred toner is not subject to the transfer process. The cleaning device 520 electrostatically removes such transfer residual toner and untransferred toner.

Figure 4:
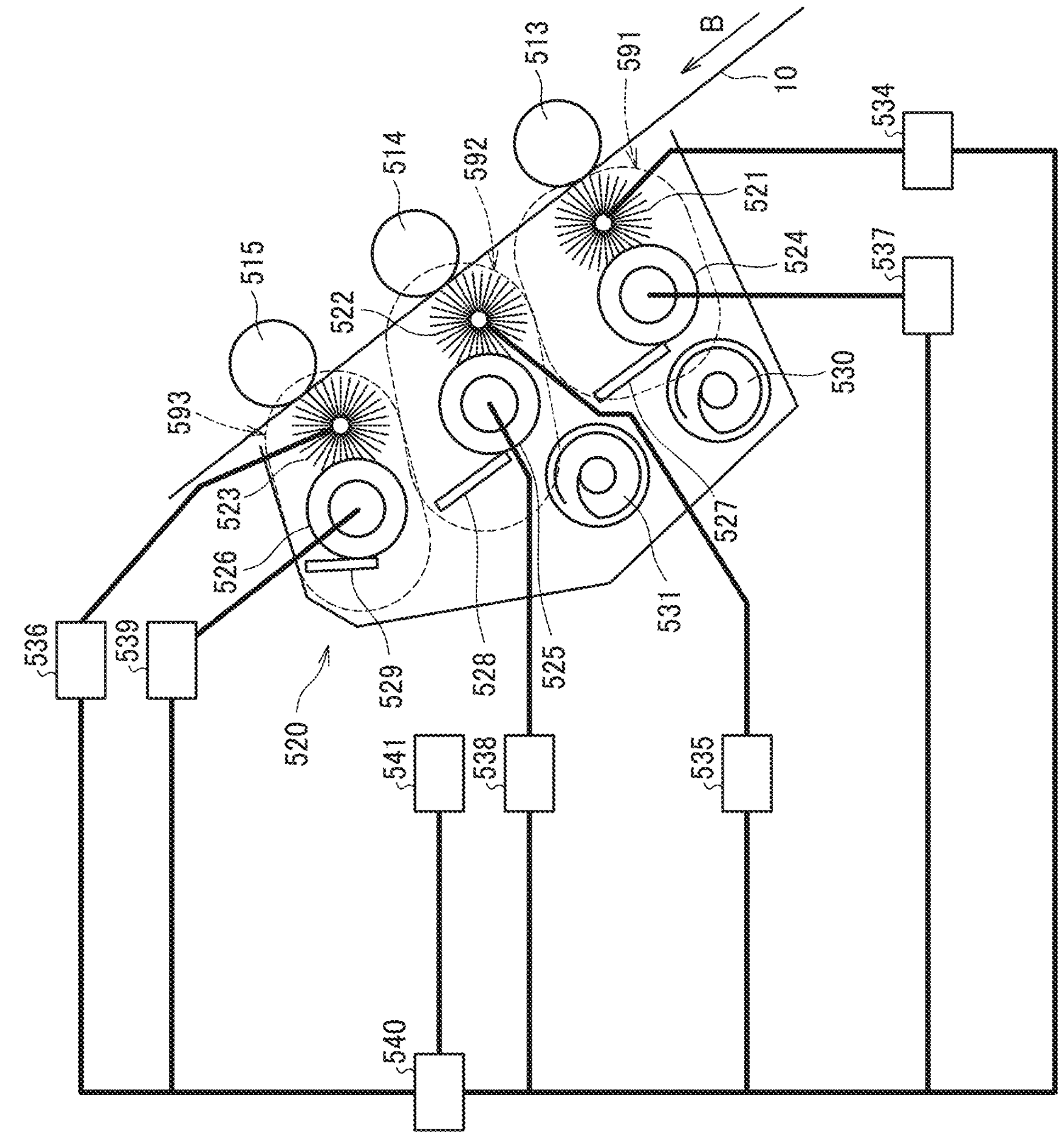
FIG. 4 is a schematic diagram of a cleaning device according to an embodiment of the present disclosure.

FIG. 4 is a schematic diagram illustrating the configuration of the cleaning device 520 according to an embodiment of the present disclosure. In FIG. 4, the intermediate transferor 10 rotates in a direction indicated by an arrow B.

As illustrated in FIG. 4, the cleaning device 520 according to the present embodiment includes multiple cleaning units. Specifically, the cleaning device 520 includes three cleaning units that are a first cleaning unit 591, a second cleaning unit 592, and a third cleaning unit 593. The first cleaning unit 591, the second cleaning unit 592, and the third cleaning unit 593 unit include cleaners 521, 522, and 523, collection rollers 524, 525, and 526, and blades 527, 528, and 529, respectively. The cleaner contacts the intermediate transferor 10 serving as a toner image bearer and electrostatically removes toner on the toner image bearer. The collecting roller serving as a toner collector electrostatically collects toner on the cleaner. The blade serving as a remover rubs against the surface of the toner collecting roller and scrapes off to remove toner on the toner collecting roller. The cleaning device 520 includes toner discharge coils 530 and 531 as a conveyor to convey the toner collected by the toner collection rollers and the blades to a waste toner tank in the body of the image forming apparatus.

Cleaning opposed rollers 513, 514, and 515 are disposed at positions facing the cleaners 521, 522, and 523, respectively. The intermediate transferor 10 is interposed between the cleaner and the cleaning opposed roller. The cleaning opposed rollers 513, 514, and 515 are made of conductive material and are grounded. The cleaners 521, 522, and 523 are connected to a cleaning bias power source 534, 535, and 536, respectively. The cleaning bias power sources 534, 535, and 536 are connected to the controller 540 that is the circuitry. A sensor 541 is disposed in the vicinity of the cleaning device 520 to detect temperature in the vicinity of the cleaner 521, 522, and 523. The controller 540 controls the cleaning bias power sources 534, 535, and 536 based on a predetermined program to apply cleaning biases to the cleaners 521, 522, and 523. At this time, the controller 540 may adjust the cleaning bias based on a result detected by the sensor 541. A cleaning electric field is formed between each of the cleaners 521, 522, and 523 to which the cleaning bias is applied and the cleaning opposed roller facing the each of the cleaners 521, 522, and 523. Each of the cleaning bias power sources 534, 535, and 536 may be a constant current power source that outputs a constant current or a constant voltage power source that outputs a constant voltage.

The collection rollers 524, 525, and 526 are in contact with the cleaner 521, 522, and 523 and collect the toner from the cleaner 521, 522, and 523, respectively. The motor 519 rotates the cleaner 521, 522, and 523 and the collection roller 524, 525, and 526. The image forming apparatus includes collecting bias power sources 537, 538, and 539 each of which outputs a collecting bias. The polarity of the collecting bias is the same as the polarity of the cleaning bias, and the absolute value of the collecting bias is larger than the absolute value of the cleaning bias. As a result, an electric field is formed between the cleaner and the collecting roller, and the toner moves from the cleaner to the collecting roller.

The blades 527, 528, and 529 scrapes off the toner on the toner collection rollers 524, 525, and 526, respectively. The toner discharge coils 530 and 531 rotate to discharge the scraped toner to the outside of the cleaning device 520.

The cleaner includes, for example, a cleaning brush or a cleaning roller. The cleaning brush is not limited in terms of a brush bristle density, a brush resistance, a fiber diameter, an applied voltage, a fiber type, and a brush fiber biting amount, which can be selected as appropriate. Examples of the fiber type include nylon, acrylic, and polyester.

Figure 5:
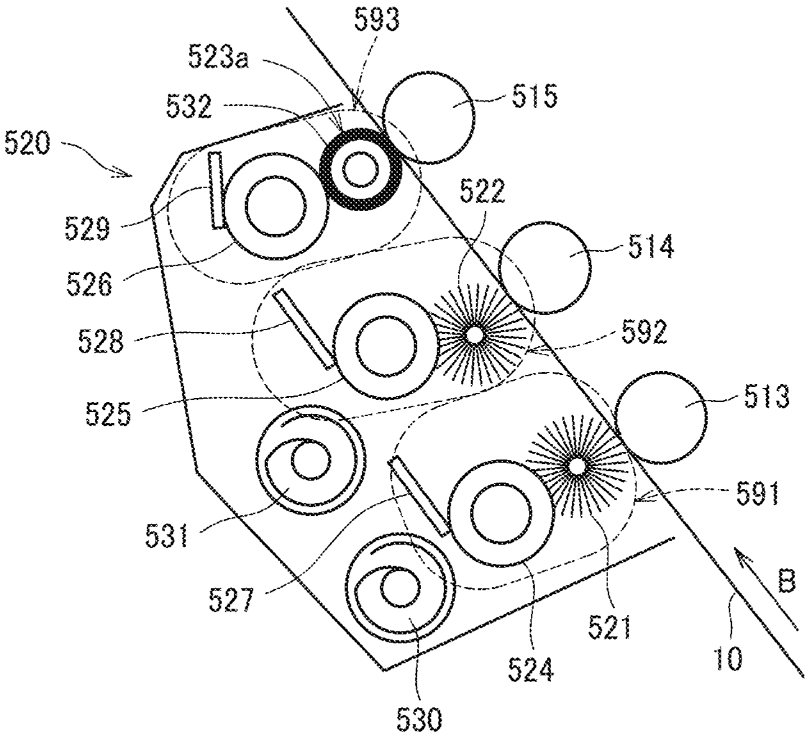
FIG. 5 is a schematic diagram illustrating a modification of the cleaning device.

The cleaning roller may be, for example, made of a metal roller having a surface coated with resin to adjust the resistance value. The surface may be porous or smooth. In the present embodiment, the cleaner 521 and the cleaner 522 are made of different materials and have different resistance values. As illustrated in FIG. 4, the cleaning device 520 may have multiple cleaners that are cleaning brushes or may have a cleaning roller 523*a* and cleaning brushes as illustrated in FIG. 5.

The following describes the cleaning biases applied to the cleaners.

The cleaning device 520 includes multiple cleaning units, and at least one cleaning unit has a cleaner to which a voltage of a polarity different from that of the cleaner included in the other cleaning unit is applied. In other words, the cleaning device 520 includes at least two cleaners to which voltages having different polarities are applied. Specifically, the cleaning device 520 includes at least one cleaner to which the cleaning bias having a negative polarity is applied and at least one cleaner to which the cleaning bias having a positive polarity is applied.

The voltage is applied to each of the cleaners 521, 522, and 523 via a metal shaft of the cleaner which is a rotator. When a large amount of toner adheres to the cleaner, the potential of the cleaner decrease. In order to reduce the above-described potential decrease, the cleaning device 520 may include a charge applicator that applies a charge to the surface of each of the cleaners 521, 522, and 523. Examples of the charge applicator include a round metal bar and a metal plate.

The movement of the intermediate transferor 10 conveys the transfer residual toner or the untransferred toner on the intermediate transferor 10 to a position facing the cleaner 521 in the first cleaning unit 591. The cleaning bias power source 534 applies a voltage of a polarity opposite to the normal charge polarity of the toner to the cleaner 521 in the first cleaning unit 591 located the most upstream in the moving direction of the intermediate transferor, and the cleaner electrostatically adsorbs the toner while rotating. The cleaning bias power source 535 applies a voltage to collect toner having a polarity opposite to the polarity of the toner collected by the first cleaning unit 591 to the cleaner 522 in the second cleaning unit 592 adjacent to the first cleaning unit 591, and the cleaner 522 electrostatically adsorbs the toner having the opposite polarity.

In the present embodiment, the cleaner 521 and the cleaner 522 are made of different materials. For this reason, the controller 540 stores base values that are cleaning biases experimentally predetermined to be suitable for the cleaners 521 and 522 in a memory of the controller 540 and determines cleaning biases applied to the cleaners 521 and 522 as described below. Specifically, the controller 540 controls the cleaning bias power sources 534 and 535 to apply a larger bias to a cleaner having a larger resistance value than a bias applied to the other cleaner having a smaller resistance value. The cleaners 521 and 522 may be made of the same material.

In addition, the base values may be experimentally predetermined to change the cleaning biases applied to the cleaners 521 and 522 depending on the material of the intermediate transferor 10 to be cleaned. Specifically, the cleaning bias applied to the cleaner to clean the intermediate transferor 10 having a larger resistance value is determined to be larger than the cleaning bias applied to the cleaner to clean the intermediate transferor 10 having a smaller resistance value.

As described above, the basic values of the cleaning biases to be applied to the cleaners 521 and 522 are predetermined. The controller 540 corrects the basic values based on conditions such as environmental conditions to determine the cleaning biases.

In the present embodiment, the controller 540 calculates the following Expression (3) to determine a first cleaning bias applied to each of the cleaners 521 and 522 during an image formation start process.

$$\text{First cleaning bias } [V] = \text{basic value } [V] \times \text{temperature correction coefficient } [\%]/100 \times \text{linear velocity correction coefficient } [\%]/100 \times \text{untransferred toner correction coefficient } [\%]/100. \qquad \text{Expression (3)}$$

The untransferred toner correction coefficient for the cleaner 521 in the first cleaning unit 591 is different from the untransferred toner correction coefficient for the cleaner 522 in the second cleaning unit 592. Specifically, the controller 540 as the circuitry sets the untransferred toner correction coefficient for the cleaner 521 located the most upstream in the moving direction of the intermediate transferor to increase the absolute value of the cleaning bias applied to the cleaner 521. The controller 540 sets the untransferred toner correction coefficient for the cleaner 522 adjacent to the cleaner 521 and downstream from the cleaner 521 in the moving direction to decrease an absolute value of the cleaning bias applied to the cleaner 522. Changing the cleaning biases applied to the cleaners as described above enables collecting toner having different charges.

In order to remove the transfer residual toner after the image formation start process, the controller 540 calculates the following expression (4) to determine a second cleaning bias applied to the cleaners 521 and 522.

$$\text{Second cleaning bias } [V] = \text{basic value } [V] \times \text{temperature correction coefficient } [\%]/100 \times \text{linear velocity correction coefficient } [\%]/100 \text{ Expression.} \qquad \text{Expression (4)}$$

The image formation start process starts immediately after the image forming apparatus starts image forming operation to form the toner image and ends a timing before the transfer residual toner generated by the image forming operation reaches the cleaner 521 located the most upstream. This timing is after the toner images are formed on the photoconductors in the image forming apparatus, transferred onto the intermediate transferor, and the full-color toner image is secondarily transferred onto the sheet. This timing is set in consideration of the time required for the controller to switch the cleaning bias. Forming the toner image means all image forming operations including, for example, operations to firstly form the full-color image on the sheet after the power is turned on and machine adjustment operations such as toner density adjustment without sheet passing. The image formation start process includes a recovery operation from an error such as a sheet jam or turning off the power supplied to the image forming apparatus. At this time, toner that has not been transferred to the sheet is on the intermediate transferor 10. The above-described "after the image formation start process" means the time after the above-described timing. In the image forming apparatus, the untransferred toner exists on the intermediate transferor 10 before the above-described timing and immediately after the image forming apparatus starts forming the toner image after the jam occurred.

In other words, when the occurrence of the jam or turning off the power supplied to the image forming apparatus intercepts the image forming operations, the untransferred toner is left on the intermediate transferor 10. The amount of untransferred toner on the intermediate transferor 10 at this time is larger than the amount of transfer residual toner generated by normal image forming operation. In addition, the charge amount of the untransferred toner is different from that of the transfer residual toner. As a result, the cleaners 521 and 522 may not satisfactorily remove the untransferred toner from the intermediate transferor 10.

The controller 540 in the present embodiment uses the untransferred toner correction coefficient to correct the cleaning bias applied to each of the cleaners 521 and 522 during an image formation start process. As a result, even if the occurrence of the jam or turning off the power supplied to the image forming apparatus generates the untransferred toner remaining on the intermediate transferor 10, the above-described control enables applying the cleaning biases suitable for cleaning the untransferred toner to the cleaner 521 and 522, and the cleaner 521 and 522 can suitably clean the untransferred toner on the intermediate transferor 10. The above-described control can enhance the cleaning performance of the cleaners 521 and 522. The controller 540 according to the present embodiment performs the above-described control during the image formation start process. A control method may be considered in which the controller stores the occurrence of the jam in the memory and changes the correction coefficient for cleaning. However, for example, when the power is suddenly turned off during the image forming operation, the untransferred toner remains on the intermediate transferor, but the controller cannot recognize the presence of the untransferred toner. Even in such a case, the cleaning device 520 according to the present embodiment can suitably clean the untransferred toner on the intermediate transferor 10. In addition, the sensor 541 detects temperature. When the temperature is high, the controller 540 decreases the correction coefficient to decrease the cleaning bias. When the temperature is low, the controller 540 increases the correction coefficient to increase the cleaning bias. As a result, the cleaning device 520 suitably cleans the untransferred toner and the transfer residual toner on the intermediate transferor 10 in various temperatures.

The image forming apparatus may be driven at multiple linear velocities. In other words, the image forming apparatus may include the motor 519 rotatable at multiple rotation speeds, and the controller 540 may control the motor 519 to change the driving speed of the image forming apparatus. In this case, when the controller 540 decreases the linear velocity, the controller 540 decreases the correction coefficient so that the cleaning bias is smaller than the cleaning bias when the linear velocity is high.

In other words, the image forming apparatus according to the present embodiment includes the intermediate transferor 10 as the toner image bearer movable in the moving direction to bear the toner image, the cleaner 521 as a first cleaner, the cleaner 522 as a second cleaner, the bias power source 534 as a first bias power source, the bias power source 535 as a second bias power source, and the controller 540 as the circuitry to control the first bias power source and the second bias power source.

The cleaner 521 as the first cleaner and the cleaner 522 as the second cleaner contact the intermediate transferor 10 as the toner image bearer. The cleaner 522 as the second cleaner is adjacent to the first cleaner and downstream from the first cleaner in the moving direction. The bias power source 534 as the first bias power source and the bias power source 535 as the second bias power source output cleaning biases corresponding to the first cleaning bias and the second cleaning bias, respectively, but they are different from each other. The controller 540 as the circuitry calculates the above Expression (3) including the untransferred toner correction coefficient to determine the first biases for the cleaners 521 and 522. The controller 540 controls the bias power source 534 as the first bias power source and the bias power source 535 as the second bias power source to output the first biases to the cleaners 521 and 522, respectively in response to a start of the image forming operation. As a result, the cleaners 521 and 522 efficiently remove the untransferred toner from the intermediate transferor 10.

Subsequently, the controller 540 calculates the second cleaning biases for the cleaners 521 and 522 using the Expression (4) and controls the bias power sources 534 and 535 to switch outputs of the bias power sources 534 and 535 from the first cleaning biases to the second cleaning biases before the transfer residual toner reaches the cleaner 521.

Figure 6A:
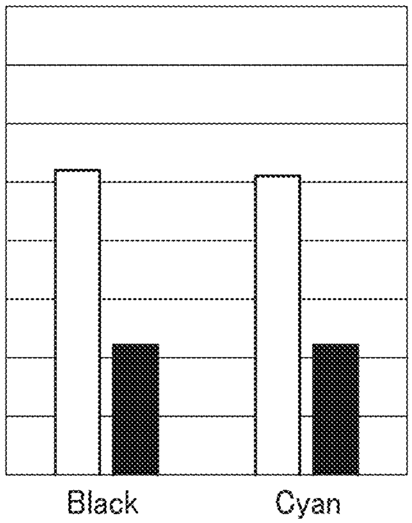
FIGS. 6A and 6B are graphs illustrating results of experiments that examined amounts of toner on an intermediate transferor after the cleaning device according to an embodiment and a cleaning device according to a comparative example clean transferred toner on the intermediate transferor.
Figure 6B:
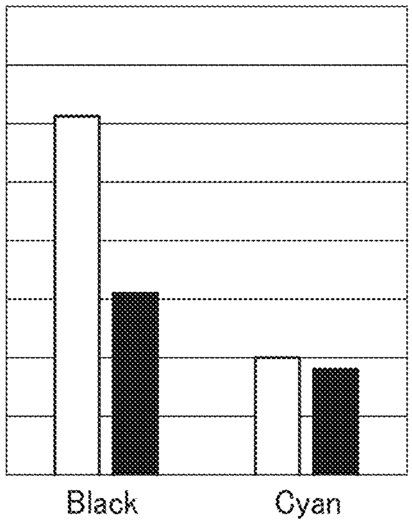

The following describes experimental results with reference to FIGS. 6A and 6B. In the experiments, amounts of toner on the intermediate transferor 10 after the cleaning device 520 cleans the transferred toner on the intermediate transferor 10 were examined in the image forming apparatus according to the present embodiment and an image forming apparatus according to a comparative example. A controller in the image forming apparatus according to the comparative example did not correct the cleaning biases using the untransferred toner correction coefficient. The vertical axis of FIG. 6 indicates the amount of toner on the intermediate transferor 10 after the cleaning device according to the present embodiment and the comparative example cleans the untransferred toner on the intermediate transferor 10. White bars on the left side of black bars indicate the results of the comparative example, and black bars indicate the results of the present embodiment. FIG. 6A is a graph illustrating the results of the experiments under a low-temperature and low-humidity environment, and FIG. 6B is a graph illustrating the results of the experiments under the high-temperature and high-humidity environment. In FIGS. 6A and 6B, "Black" indicates the results of the experiments using black toner, and "Cyan" indicates the results of experiments using cyan toner.

As illustrated in FIGS. 6A and 6B, the amounts of toner left on the intermediate transferor after cleaning in the present embodiment were smaller than those in the comparative example in all conditions, that is, the low temperature and low humidity, the high temperature and high humidity, the black toner, and the cyan toner. Thus, adding the correction using the untransferred toner correction coefficient to the cleanings bias can enhance the cleaning performance to clean the untransferred toner.

The above-described embodiments are illustrative and do not limit this disclosure. It is therefore to be understood that within the scope of the appended claims, numerous additional modifications and variations are possible to this disclosure otherwise than as specifically described herein.

In the above description, the intermediate transferor is described as the toner image bearer, but present disclosure is not limited to this. The image bearer may be the photoconductor.

The image forming apparatus according to the present embodiments of the present disclosure is applicable not only to the color image forming apparatus illustrated in FIG. 1 but also to a monochrome image forming apparatus, a copier, a printer, a facsimile machine, or a multifunction peripheral including at least two functions of the copier, printer, and facsimile machine.

The sheet is one example of a recording medium. The recording medium may be a sheet of plain paper, thick paper, thin paper, a postcard, an envelope, coated paper, art paper, tracing paper, overhead projector (OHP) sheet, plastic film, prepreg, copper foil, or the like.

Aspects of the present disclosure are, for example, as follows.

First Aspect

In a first aspect, an image forming apparatus includes a toner image bearer, a transfer device, a cleaner, a bias power source, and circuitry such as the controller 540. The toner image bearer bears a toner image formed by image forming operation. The transfer device performs a transfer process to transfer the toner image from the toner image bearer to a sheet. The cleaner contacts the toner image bearer to remove transfer residual toner on the toner image bearer that is subject to the transfer process and remove untransferred toner on the toner image bearer that is not subject to the transfer process. The bias power source applies one of a first bias and a second bias different from the first bias to the cleaner. The circuitry controls the bias power source to output the first bias to the cleaner in response to a start of the image forming operation to remove the untransferred toner from the toner image bearer and control the bias power source to switch an output from the first bias to the second bias to remove the transfer residual toner from the toner image bearer.

Second Aspect

In a second aspect, the image forming apparatus according to the first aspect further includes multiple cleaners including the cleaner and multiple bias power sources including the bis power source. The multiple cleaners contact the toner image bearer and have different resistance values with each other. The multiple bias power sources apply one of the first bias and the second bias to the multiple cleaners, respectively. The circuitry determines the first bias and the second bias to be output the multiple cleaners differently according to the resistance values of the multiple cleaners.

Third Aspect

In a third aspect, the multiple cleaners in the image forming apparatus according to the second aspect include a first cleaner and a second cleaner. The first cleaner has a first resistance, and the second cleaner has a second resistance larger than the first resistance. The multiple bias power sources include a first bias power source and a second bias power source. The first bias power source applies a bias to the first cleaner, and the second bias power source applies another bias larger than the bias to the second cleaner.

Fourth Aspect

In a fourth aspect, the image forming apparatus according to any one of the first to third aspects further includes a sensor to detect a temperature, and the circuitry determines the first bias and the second bias based on the temperature detected by the sensor.

Fifth Aspect

In a fifth aspect, the image forming apparatus according to any one of the first to fourth aspects further includes a motor rotatable at different linear velocities to drive the toner image bearer and the cleaner, and the circuitry changes the bias based on the different linear velocities of motor.

Sixth Aspect

In a sixth aspect, the circuitry in the image forming apparatus according to any one of the third to fifth aspects calculates a following Expression to determine the first bias applied to the first cleaner and the second cleaner at the start of the image forming operation, $$\text{First bias } [V] = \text{basic value } [V] \times \text{temperature correction coefficient } [\%]/100 \times \text{linear velocity correction coefficient } [\%]/100 \times \text{untransferred toner correction coefficient } [\%]/100.$$

Seventh Aspect

In a seventh aspect, the first cleaner in the image forming apparatus according to the sixth aspect is upstream of and adjacent to the second cleaner in a moving direction of the toner image bearer, and the circuitry sets a first untransferred toner correction coefficient for the first cleaner and a second untransferred toner correction coefficient for the second cleaner. The first untransferred toner correction coefficient for the first cleaner increases an absolute value of the first bias applied to the first cleaner to be larger than an absolute value of the second bias applied to the first cleaner. The second untransferred toner correction coefficient for the second cleaner decreases an absolute value of the first bias applied to the second cleaner to be smaller than an absolute value of the second bias applied to the second cleaner.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

a toner image bearer configured to bear a toner image formed by an image forming operation;

a transfer device configured to perform a transfer process to transfer the toner image from the toner image bearer to a sheet;

multiple cleaners contacting the toner image bearer and having different resistance values with each other, the multiple cleaners including at least a first cleaner having a first resistance, and a second cleaner having a second resistance greater than the first resistance, wherein the multiple cleaners are configured to remove transfer residual toner on the toner image bearer that is subject to the transfer process, and remove untransferred toner on the toner image bearer that is not subject to the transfer process;

multiple bias power sources configured to apply one of a first bias or a second bias to the multiple cleaners, respectively, the second bias being larger than the first bias, the multiple bias power sources including a first bias power source configured to apply the first bias to the first cleaner, and a second bias power source configured to apply the first bias to the second cleaner; and circuitry configured to control the first bias power source to output the first bias to the first cleaner in response to a start of the image forming operation to remove the untransferred toner from the toner image bearer, and control the first bias power source to switch an output from the first bias to a third bias, different from the first bias, to remove the transfer residual toner from the toner image bearer.

2. The image forming apparatus according to claim 1, further comprising:

a sensor configured to detect a temperature, wherein the circuitry is further configured to determine the first bias and the third bias based on the temperature detected by the sensor.

3. The image forming apparatus according to claim 1, further comprising:

a motor rotatable at different linear velocities to drive the toner image bearer and the multiple cleaners, wherein the circuitry is further configured to change at least one of the first bias or the second bias based on the different linear velocities of the motor.

4. The image forming apparatus according to claim 1, wherein the circuitry is further configured to determine the first bias applied to the first cleaner at the start of the image forming operation, according to the expression $$\text{First bias } [V] = \text{basic value } [V] \times \text{temperature correction coefficient } [\%]/100 \times \text{linear velocity correction coefficient } [\%]/100 \times \text{untransferred toner correction coefficient } [\%]/100.$$

5. The image forming apparatus according to claim 4, wherein the first cleaner is upstream of and adjacent to the second cleaner in a moving direction of the toner image bearer, and wherein the circuitry is further configured to set a first untransferred toner correction coefficient for the first cleaner, the first untransferred toner correction coefficient increasing an absolute value of the first bias applied to the first cleaner to be larger than an absolute value of the third bias applied to the first cleaner; and set a second untransferred toner correction coefficient for the second cleaner that decreases an absolute value of the second bias applied to the second cleaner to be smaller than an absolute value of a fourth bias applied to the second cleaner.

6. The image forming apparatus according to claim 1, wherein the multiple cleaners include at least one of cleaning brushes or cleaning rollers.

7. An image forming apparatus comprising:

a toner image bearer configured to bear a toner image formed by an image forming operation;

a transfer device configured to perform a transfer process to transfer the toner image from the toner image bearer to a sheet;

a cleaner contacting the toner image bearer, the cleaner configured to remove transfer residual toner on the toner image bearer that is subject to the transfer process, and remove untransferred toner on the toner image bearer that is not subject to the transfer process;

a bias power source configured to apply one of a first bias or a second bias different from the first bias to the cleaner;

a motor rotatable at different linear velocities to drive the toner image bearer and the cleaner; and circuitry configured to control the bias power source to output the first bias to the cleaner in response to a start of the image forming operation to remove the untransferred toner from the toner image bearer, control the bias power source to switch an output from the first bias to the second bias to remove the transfer residual toner from the toner image bearer, and change the bias based on the different linear velocities of the motor.

8. The image forming apparatus according to claim 7, further comprising:

multiple cleaners including the cleaner, the multiple cleaners contacting the toner image bearer and having different resistance values with each other; and multiple bias power sources including the bias power source, wherein the multiple bias power sources are configured to apply one of the first bias or the second bias to the multiple cleaners, respectively, wherein the circuitry is further configured to determine the first bias and the second bias to be output to the multiple cleaners differently according to the resistance values of the multiple cleaners.

9. The image forming apparatus according to claim 8, wherein the multiple cleaners include:

a first cleaner having a first resistance, and a second cleaner having a second resistance greater than the first resistance, and wherein the multiple bias power sources include a first bias power source configured to apply a first bias to the first cleaner; and a second bias power source configured to apply a second bias, larger than the first bias, to the second cleaner.

10. The image forming apparatus according to claim 7, further comprising:

a sensor configured to detect a temperature, wherein the circuitry is further configured to determine the first bias and the second bias based on the temperature detected by the sensor.

11. The image forming apparatus according to claim 9, wherein the circuitry is further configured to determine the first bias applied to the first cleaner and the second cleaner at the start of the image forming operation, according to the expression $$\text{First bias }[V] = \text{basic value }[V] \times \text{temperature correction coefficient}[\%]/100 \times \text{linear velocity correction coefficient }[\%]/100 \times \text{untransferred toner correction coefficient }[\%]/100.$$

12. The image forming apparatus according to claim 11, wherein the first cleaner is upstream of and adjacent to the second cleaner in a moving direction of the toner image bearer, and wherein the circuitry is further configured to set a first untransferred toner correction coefficient for the first cleaner, the first untransferred toner correction increasing an absolute value of the first bias applied to the first cleaner to be larger than an absolute value of a third bias applied to the first cleaner; and set a second untransferred toner correction coefficient for the second cleaner that decreases an absolute value of the second bias applied to the second cleaner to be smaller than an absolute value of a fourth bias applied to the second cleaner.

13. The image forming apparatus according to claim 7, wherein the cleaner is at least one of a cleaning brush or a cleaning roller.

* * * * *